United States Patent Office 3,390,442
Patented July 2, 1968

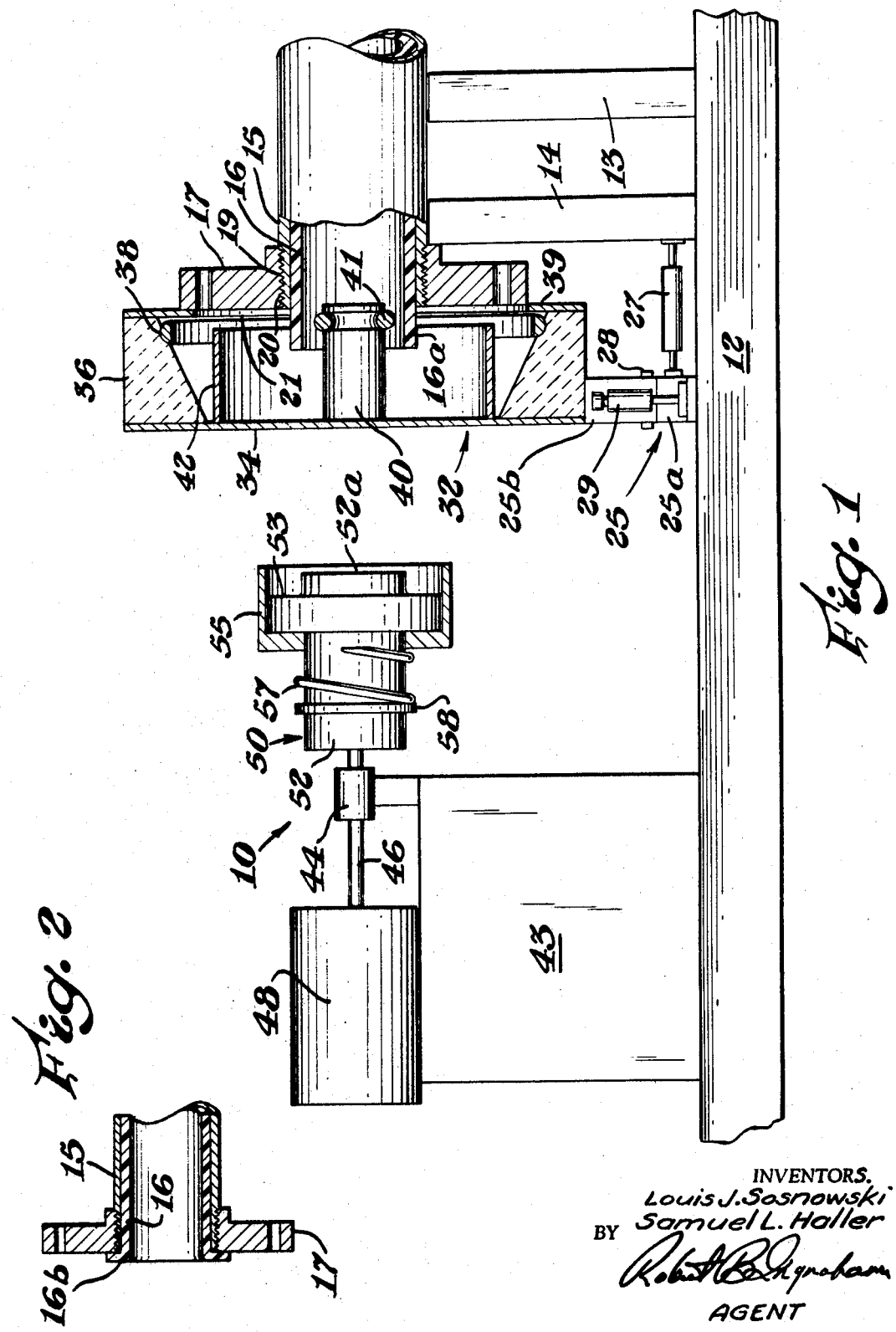

3,390,442
METHOD FOR FLANGING THERMOPLASTIC LINE PIPES
Louis J. Sosnowski, Jr., Sanford, and Samuel L. Haller, Merrill, Mich., assignors to The Dow Chemical Company, Midland, Mich., a corporation of Delaware
Original application Apr. 9, 1964, Ser. No. 358,584. Divided and this application Feb. 20, 1967, Ser. No. 632,857
3 Claims. (Cl. 29—157)

ABSTRACT OF THE DISCLOSURE

Plastic lined pipe is flanged by heating an extending liner portion by means of radiant heat and subsequently molding the softened liner portion to conform to an adjacent flange.

---

This application is a divisional application of application Ser. No. 358,584, filed Apr. 9, 1964.

This invention relates to a method for the formation of flanges on the lining of a pipe having a synthetic resinous thermoplastic liner. It more particularly relates to a method for the flanging of the liner of such pipes in the field.

Many varieties of pipe employing thermoplastic resinous liners are employed in operations where chemical resistance of the conduit or pipe is required. In most applications, it is desirable that the contents of the pipe should come in contact only with the liner. In connecting lengths of such pipe, it is therefore customary to provide liner-to-liner contact. This has been accomplished in a variety of manners and means. However, in most applications where thermoplastic resinous liners are utilized in a piping system, it is necessary to employ a means of joining the pipe which does not require high temperatures which would destroy or deform the lining material. Therefore a bolted flange is most often applied, although in certain instances beneficially a union is utilized. Usually when such a piping system is installed, the dimensions of the sections of pipe must be known and the pipe manufactured to a suitable length having appropriately flanged liners and then the prefabricated pipe is shipped to the point of installation.

It is an object of this invention to provide a method which permits field fabrication of thermoplastic resinous lined pipe.

A further object of this invention is to provide a method which permits the flanging of the liner of a thermoplastic resinous lined pipe without significant heat damage to the portion of the liner being formed into the flange.

Another object of the invention is to provide a method for the fabrication of flanged end portions of the thermoplastic resinous liner of the lined pipe wherein the strength of the liner adjacent to the flange is not seriously reduced.

These benefits and other advantages in accordance with the present invention are achieved in a method of flanging the liner of a thermoplastic resinous lined pipe comprising removing a portion of the pipe having a generally cylindrical configuration adjacent at least one end of the pipe to leave a generally unsupported cylindrical portion of the liner extending therefrom, generally uniformly heating the extending portion of the liner by means of radiant heat until the portion is in a heat plastified condition, forcing the extending portion of the lining into a generally radially extending configuration while in a heat plastified condition and subsequently cooling the radially extending portion of the liner below the heat plastified temperature.

The method of the present invention is advantageously practiced employing an apparatus comprising in cooperative combination a base, the base having affixed thereto a pipe supporting means adapted to receive a thermoplastic resinous lined pipe having a flange disposed on one end thereof, a heater movably positioned on the bed and so constructed and arranged as to be positioned relative to the pipe flange, the heater comprising a first heat source and a second heat source, the first heat source adapted to be inserted within an extending cylindrical portion of the pipe lining and provide a uniform quantity of radiant heat to the inner surface of the projecting liner portion, the second heater adapted to provide radiant heat to the external surface of the projecting cylindrical portion of the liner in such a manner that a greater quantity of radiant heat is applied to the liner adjacent the terminal portion of the pipe than to the portion of the liner most remote from the pipe, means to selectively position the heater within the pipe and remove it therefrom, a forming die, a forming die support and a forming die actuating means so constructed and arranged so as to advance the forming die to the extending portion of the pipe flange of the pipe liner and press it against the radially extending surfaces of the pipe flange to form a thermoplastic resinous liner flange.

Further features and advantages of the invention will become more apparent from the following specification when taken in connection with the drawing wherein:

FIGURE 1 is a schematic sectional representation of a pipe flanging apparatus;

FIGURE 2 depicts a resultant flanged lining prepared by the apparatus of FIGURE 1.

In FIGURE 1 there is illustrated a pipe liner flanging apparatus generally designated by the reference numeral 10. The apparatus 10 comprises a base 12 having affixed thereto pipe positioning means 13 and 14 adapted to receive and maintain in position a pipe 15 having a hollow cylindrical thermoplastic resinous liner 16 and a flange 17. The flange 17 is secured to the pipe by means of the mating thread portions 19 and 20. The flange 17 has a generally radially extending surface 21. A generally cylindrical liner portion 16a of a thermoplastic resinous liner 16 extends beyond the terminal portion of the pipe 15 and the flange face 21. Generally adjacent the pipe rest 14 is a movable heater support 25 which is slidably secured to the base 12. The support 25 is positioned by means of the support positioning means or air cylinder 27. The support 25 comprises a bed engaging portion 25a and a heater engaging portion 25b. The portions 25a and 25b are pivotally secured to each other at the pivot 28. The pivot 28 is so constructed and arranged so as to permit motion of the portion 25b in a plane generally parallel to the flange face 21. A pivot positioner or air cylinder 29 engages the support portion 25a and the support portion 25b to cause desired motion of the support in a plane parallel to the flange face 21. The heater 32 comprises a heater body 34. The heater body 34 is rigidly affixed to the support member 25b. A circumferential heater support 36 is affixed to the heater body 34 in such a manner that it is generally symmetrically disposed about the axis of a pipe positioned on the pipe supports 13 and 14. A radiant heater 38 is supported by the heater support 36. The radiant heater 38 has a generally circular configuration which is adapted to be concentric with the portion 16a of the liner 16. A stop or shield 39 is fixed to the heater support 36 and adapted to engage the flange 21 and serve as a means to maintain the heaters in fixed spaced relationship thereto. A central heater support 40 is affixed to the body 34 and projects into the portion 16a of the liner 16. The heater support 40 supports thereon a radiant heater 41 of a generally circular configuration which is in spaced relationship to the portion 16a of the liner 16. A heat shield 42 is partially interposed between the heater 38 and the portion of the liner 16a in such a manner as to direct a majority of the radiant heat at a location adjacent the face 21 of the flange 17. Remotely disposed from the pipe supports 13 and 14 is a die support 43. The die support 43 is secured to the bed 12 and carries remote from the bed 12 a die mandrel bearing 44 which slidably supports a die mandrel 46. The bearing 44 is so constructed and arranged so as to support and permit motion of the die mandrel of a projected axis of the pipe 15. A die mandrel positioner 48 is affixed to the die support 43 and adapted to reciprocally move the die mandrel 46. A die assembly 50 is supported on the die mandrel 46. The die 50 is positioned generally remote from the positioning means 48 and adjacent to the pipe rest 14. The die assembly 50 comprises in comparative combination a die body 52 having defined thereon a die forming face 53, the face 53 being formed in part by a projecting portion of the die body 52a adapted to fit within the thermoplastic resinous liner 16. A sleeve 55 is resiliently positioned on the die body 52 and adapted to slide in a direction parallel to and coaxial with the axis of the pipe 15. The sleeve 55 is maintained in a position toward the pipe rest 14 by means of a spring 57 which is in engagement with a circumferential stop means or collar 58 secured to the body 52.

FIGURE 2 depicts a view of a pipe 15 having a liner 16 and a flange 17 wherein the flanged portion 16a has been deformed to form a flange 16b.

In operation of the apparatus of FIGURE 1, the thermoplastic resinous lined pipe is cut to an overall length equal to the desired length of the liner. A cylindrical portion of the pipe at the end which is to be flanged is removed by cutting through the pipe and retaining continuity of the liner, thus forming a ring-like portion of pipe which is removed to leave the projecting portion of the liner 16a. A flange such as the flange 17 is secured to the pipe in a suitable manner such as by the mating threads 19 and 20. The precise sequence of the foregoing operations is not critical and is merely a matter of convenience dependent upon the choice of the person performing the operations. The flanged pipe is then positioned upon the pipe rest in such a manner that it is substantially coaxial with the forming die assembly 50 and the inner portion 16a is directed toward the forming face 53. The radiant heaters 38 and 41 then supply heat to the liner portion 16a for a predetermined period of time until the portion 16a is heat plastified. The heater is maintained in a fixed position by means of the heater stop 39. The heat deflector or baffle 42 more centrally disposed within the heater body 34 than the heater 38 serves to shield the portion of the liner 16a remote from the flange 17 from a portion of the heat and thereby permits generally uniform heating of the liner portion 16a and eliminates overheating, burning and the like. When the liner portion 16a reaches heat forming temperature, the positioner 27 withdraws the heater assembly from the end of the lined pipe. The positioner 29 moves the heater away from the axis of the pipe and the die positioner 48 forces the forming assembly 50 toward the pipe, the forming face 53 engages the heat plastified portion 16a. The generally cylindrical sleeve 55 engages the face 21 of the flange 17. As the body 52 is forced into engagement with the heat plastified portion 16a, it is deformed and molded into a configuration such as 16b of FIGURE 2. The sleeve 55 in cooperation with the flange face 21 and the surface 53 and the projection 52a cooperates to form a generally annular mold cavity having the configuration of the flange 16b of FIGURE 2.

Utilizing an apparatus substantially in accordance with that illustrated in FIGURE 1, steel pipes having thermoplastic resinous linings of Saran, polypropylene and a chlorinated polyether (available under the trade designation of "Penton") respectively, have been provided readily and easily with flanged liners. In order to obtain optimum liner flanges, the selective heating of the extending liner portion such as 16b is required if a minimum time cycle is to be obtained. Such flanges are readily prepared wherein the thermoplastic resinous lining has a thickness of 5/32 of an inch employing heating times of a minute and even less. Such rapid operation is obtained only when the radiant heat is directed by a means such as the heater 32. Otherwise, uneven heating occurs and the strength of the flange produced using the baffle or deflector can be more than 50 percent greater than the strength of the flange prepared when the baffle is omitted. The selective heating generally produces a flange without surface defects or discoloration that are generally attained when the baffle is omitted.

In the drawing and in the foregoing discussion of the operation for the sake of clarity no reference is made to the conventional controls and power supply means employed with the positioners. Beneficially for most operations, compressed air is usually most suitable due to its ready availability. Thus, the positioners 27, 39 and 48 may be double acting air cylinders or single acting air cylinders with a spring return, or hydraulic cylinders, the choice being primarily dependent on considerations such as portability, investment and the like.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method of flanging the liner of a thermoplastic resinous lined pipe comprising removing a portion of the pipe having a generally cylindrical configuration adjacent at least one end of the pipe to leave a generally cylindrical portion of the liner extending therefrom, forcing the extending portion of the lining into a generally radially extending configuration while in a heat plasticized condition and subsequently cooling the radially extending portion of the liner below the heat plasticized temperature, the improvement which comprises generally uniformly heating the extending portion of the liner by means of radiant heat until the portion is in a heat plasticized condition, wherein the heating of the extending portion of the liner is accomplished by radiant heat applied from the inside of the liner and from the outside of the liner and the quantity of radiant heat applied to the liner adjacent the flange is greater than the quantity of heat applied to the extending portion of the liner remote from the flange.

2. The method of claim 1 wherein the pipe is a metal pipe having a flange with radiallly extending faces adjacent the extending portion of the liner.

3. The method of claim 2 including the step of interposing a heat shield between a source of radiant heat employed to apply radiant heat to the outside of the liner and the extending portion of the liner remote from the flange.

References Cited

UNITED STATES PATENTS

| 2,347,407 | 4/1944 | Goodwin | 219—34 |
| 2,823,418 | 2/1958 | Fritts | 18—19 |
| 2,876,496 | 3/1959 | Murphy | 18—56 |
| 3,142,868 | 8/1964 | Blount | 18—19 |

ROBERT F. WHITE, *Primary Examiner.*

R. R. KUCIA, *Assistant Examiner.*